(12) United States Patent
Zhang

(10) Patent No.: US 12,487,291 B2
(45) Date of Patent: Dec. 2, 2025

(54) SYSTEM FOR DETERMINING BATTERY PARAMETERS

(71) Applicant: Chaojiong Zhang, College Station, TX (US)

(72) Inventor: Chaojiong Zhang, College Station, TX (US)

( * ) Notice: Subject to any disclaimer, the term of this patent is extended or adjusted under 35 U.S.C. 154(b) by 105 days.

(21) Appl. No.: 18/028,136

(22) PCT Filed: Mar. 24, 2022

(86) PCT No.: PCT/US2022/021643
§ 371 (c)(1),
(2) Date: Mar. 23, 2023

(87) PCT Pub. No.: WO2023/027766
PCT Pub. Date: Mar. 2, 2023

(65) Prior Publication Data
US 2023/0366942 A1    Nov. 16, 2023

Related U.S. Application Data

(60) Provisional application No. 63/277,143, filed on Nov. 8, 2021, provisional application No. 63/236,023, filed on Aug. 23, 2021.

(51) Int. Cl.
*G01R 31/3835* (2019.01)
*G01R 31/36* (2020.01)
*G01R 31/389* (2019.01)
*H01M 10/04* (2006.01)
*G01R 31/385* (2019.01)

(52) U.S. Cl.
CPC ..... *G01R 31/3835* (2019.01); *G01R 31/3644* (2013.01); *G01R 31/389* (2019.01); *H01M 10/0404* (2013.01); *G01R 31/3865* (2019.01)

(58) Field of Classification Search
None
See application file for complete search history.

(56) References Cited

U.S. PATENT DOCUMENTS

| | | | |
|---|---|---|---|
| 4,363,407 | A | 12/1982 | Buckler et al. |
| 5,705,929 | A | 1/1998 | Caravello et al. |
| 5,966,014 | A | 10/1999 | Zhang et al. |
| 6,291,972 | B1 | 9/2001 | Zhang |

(Continued)

OTHER PUBLICATIONS

International Search Report and Written Opinion of the International Searching Authority dated Jul. 25, 2022, for corresponding International Application No. PCT/US2022/021643.

*Primary Examiner* — Jas A Sanghera
(74) *Attorney, Agent, or Firm* — Stephen S. Hodgson

(57) ABSTRACT

A difference voltmeter (DVM) is used in a battery testing apparatus for determining values of open-circuit voltage, self-discharge, self-discharge rate and internal resistance of batteries. A reference voltage Vref is generated. A difference OCV relative to Vref is determined at times t1 and t2 as $\Delta OCV1$ and $\Delta OCV2$. The SD for a battery is determined as $(\Delta OCV2 - \Delta OCV1)$, and the SDR is determined as $SD/(t2-t1)$. The IR of a battery is determined by measuring voltage at two levels of direct current and calculating IR as equal to $(\Delta V2 - \Delta V1)/(I2-I1)$. The smaller FSR of the DVM allows a more accurate measurement of OCV, which allows the time for determining the SDR to be reduced.

16 Claims, 2 Drawing Sheets

(56) References Cited

U.S. PATENT DOCUMENTS

| | | |
|---|---|---|
| 6,906,523 B2 | 6/2005 | Bertness et al. |
| 9,608,456 B2 | 3/2017 | Martin et al. |
| 10,429,449 B2 | 10/2019 | van Bremen |
| 2002/0047711 A1 | 4/2002 | Bertness et al. |
| 2009/0224771 A1* | 9/2009 | Deveau ................ G01R 31/386 324/600 |
| 2013/0041606 A1* | 2/2013 | Tang ..................... G01R 31/52 702/63 |
| 2013/0175206 A1* | 7/2013 | Li .......................... B07C 5/344 209/575 |
| 2014/0035532 A1 | 2/2014 | Brandl et al. |
| 2014/0247016 A1 | 9/2014 | Stottlemyer et al. |
| 2015/0060290 A1 | 3/2015 | Xu et al. |
| 2015/0364748 A1 | 12/2015 | Amiruddin et al. |
| 2018/0164373 A1 | 6/2018 | Wang et al. |
| 2019/0074704 A1 | 3/2019 | Krasovitsky et al. |
| 2019/0146012 A1* | 5/2019 | Veil ..................... H01H 47/002 702/64 |
| 2020/0152960 A1 | 5/2020 | Grunwald et al. |
| 2020/0161891 A1 | 5/2020 | Rothe |
| 2020/0176733 A1* | 6/2020 | Kim ....................... B60L 50/50 |
| 2022/0268852 A1 | 8/2022 | Zhang |

\* cited by examiner

SYSTEM FOR DETERMINING BATTERY PARAMETERS

CROSS REFERENCE TO RELATED APPLICATIONS

This application claims priority to U.S. Provisional Patent Application Ser. Nos. 63/277,143 filed on Nov. 8, 2021, and 63/236,023 filed on Aug. 23, 2021, which are incorporated by reference. International Patent Application No. PCT/US2020/062548, Publication No. WO 2021/113161 A2, is a related application, which is incorporated by reference.

BACKGROUND OF THE INVENTION

1. Field of the Invention

This patent application pertains to testing and sorting batteries during and after the batteries are formed, and more particularly to improving the accuracy of measurements and reducing the time required to determine characteristics of the batteries.

2. Description of the Related Art

Battery manufacturing is an important industry, particularly batteries based on lithium ion technology. Batteries are tested before use for quality control. Part of the battery production procedure includes final formation of and sorting of batteries. The present inventor's International Patent Application Pub. No. WO 2021/113161 A2 discloses a system for forming and testing batteries under mixed connection conditions in parallel and in series. The present inventor's U.S. Pat. No. 6,291,972 is titled "System for Battery Formation, Charging, Discharging and Equalization," which discloses concepts for forming and testing batteries, is incorporated by reference in its entirety for all purposes. Tests on batteries after formation and for quality control and sorting include the measurement of an open-circuit voltage, internal resistance and a self-discharge rate for each battery.

Small electronic devices may use a single lithium ion battery. Electric vehicles and large-scale electric storage use many batteries connected together in a battery pack. A battery pack performs as well as the worst individual battery in the pack, so a significant effort is made to form a battery pack from batteries having consistent performance characteristics. A considerable amount of research has been conducted for how best to determine battery characteristics and then to sort batteries according to common characteristics. The battery manufacturing industry presently directly measures certain parameters and sorts batteries into groups having reasonably consistent values for the parameters. Other methods for grading and sorting batteries include modeling, algorithms and electrochemical analysis. A battery's parameters that can be measured directly include its voltage, which is typically an open-circuit voltage, its internal resistance and its self-discharge rate.

Batteries are typically sorted according to common values for open-circuit voltage, internal resistance and self-discharge rate. To determine the self-discharge rate, a battery's open-circuit voltage is measured, and then the battery is stored or aged for a period of time, which can be a period of days or weeks, after which the open-circuit voltage is measured again. The difference in voltage over the period of time is used to calculate the self-discharge rate. The difference in voltage is a small value, which is difficult to measure accurately. A longer period of time between the voltage measurements may provide a more accurate measurement of the self-discharge rate. However, there is a need to increase the production rate for making batteries and battery packs, so there is a need to improve the accuracy of the measurement of the self-discharge rate while at the same time reducing the aging period for the batteries between the measurements of open-circuit voltage before and after the aging period.

SUMMARY OF THE INVENTION

The present invention provides a difference voltmeter that comprises a reference voltage generator (RVG) configured to generate a reference voltage and output the reference voltage via its first lead; a first operational amplifier (OPA), the first OPA has a first input lead to be connected to a first terminal of an object to be measured, a second input lead connected to the first lead of the RVG, and the first OPA is configured to output via its output lead a difference voltage representing a difference between a voltage of the object and the reference voltage; and an analog-to-digital converter (ADC) configured to receive the difference voltage from the output lead of the first OPA and convert the difference voltage from analog signal to digital signal.

The difference voltmeter is used in a battery testing apparatus that comprises a charging and discharging module for providing a charging or discharging current to one or more batteries and a control unit configured to provide outputs indicating values of parameters for the one or more batteries. The control unit is preferably a microcontroller or a computing device or a computer or a personal computer. Typical parameters include an open-circuit voltage (OCV), a self-discharge (SD), a self-discharge rate (SDR) and/or an internal resistance (IR) of the batteries. The reference voltage generator is preferably configured to generate a reference voltage Vref, where the first OPA is configured to output a difference OCV of a battery at a time t1 ($\Delta OCV1$) and at a later time t2 ($\Delta OCV2$), where the difference OCV of a battery is the OCV of the battery minus Vref, and where the control unit is preferably configured to determine the SD for the battery as $\Delta OCV2 - \Delta OCV1$ and to determine the SDR for the battery as $(\Delta OCV2 - \Delta OCV1)/(t2-t1)$.

The control unit is preferably configured to cause the charging and discharging module to deliver a current I1 passing through a battery and a different current I2 passing through the battery, where the control unit is configured to obtain a difference voltage $\Delta V1$ while the current I1 is passing through the battery and a difference voltage $\Delta V2$ while the current I2 is passing through the battery from the difference voltmeter, and where the control unit is preferably configured to determine the IR of each battery as equal to $(\Delta V2 - \Delta V1)/(I2-I1)$.

The present invention provides a battery testing machine in which the battery testing apparatus is used and is preferably configured to connect electrically to a battery cell; provide a reference voltage Vref; measure a $\Delta OCV1$ at a first time t1, wherein $\Delta OCV1 = OCV1 - Vref$; measure a $\Delta OCV2$ at a second time t2, wherein $\Delta OCV2 = OCV2 - Vref$; calculate the SD for the battery cell as the difference between $\Delta OCV1$ and $\Delta OCV2$; and calculate the SDR for the battery cell as SD divided by the difference between t2 and t1. The battery testing machine is preferably configured to: pass a first current I1 and a second current I2 through the battery cell, where I2 is not equal to I1; measure a first $\Delta V1 = (V1 - Vref)$ of the cell while passing the current I1 through the cell; measure a second $\Delta V2 = (V2 - Vref)$ of the cell while passing the current I2 through the cell; calculate a ΔV=(ΔV2−ΔV1); calculate a ΔI as I2−I1; and calculate the IR of the battery cell as equal to ΔV/ΔI.

In another embodiment, the present invention provides a method for determining the internal resistance (IR) of a battery using direct current (DCIR) that includes the steps of measuring a voltage V1 of a battery at a time t1 while passing a direct current I1 through the battery; changing the direct current passing through the battery to I2, wherein I2 is not equal to I1; measuring a voltage V2 of the battery at a time t2 while passing the direct current I2 through the battery; and using a difference voltmeter (DVM) to determine the values of V1 and V2. The values of V1 and V2 are determined using a first instrumentation amplifier (INA1); the DVM employs a reference voltage generator to generate a voltage Vref; the DVM employs a second instrumentation amplifier (INA2); V1 and Vref are input to the INA2, which provides an output of V1−Vref; V2 and Vref are input to the INA2, which provides an output of V2−Vref. Each of INA1 and INA2 have a full scale range (FSR), and the FSR of INA2 is less than the FSR of INA1, preferably less than 0.1*FSR of INA1. The IR of the battery is calculated as equal to ((V2−Vref)−(V1−Vref))/(I2−I1). The abs(Vref−V1) is preferably less than or equal to 0.1*abs(V1), and the abs(Vref−V2) is preferably less than or equal to 0.1*abs(V2).

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS TERMINOLOGY USED HEREIN

OCV: Open-circuit voltage of a battery
SD: Self discharge expressed by OCV drop, usually in unit of millivolt.
SD=ΔOCV(2−1)=OCV2−OCV1
SDR: Self-discharge rate, expressed by SD/Δt, or SD=SDR*Δt
Vref: reference voltage
IR: internal resistance of a battery
ACIR: technology using AC current to measure IR
DCIR: technology using DC current to measure IR
ACR: equipment used for measurement of IR with ACIR technology
t: time. The time unit could be day in SDR measurement and can be millisecond in DCIR measurement. Δt(2−1)=t2−t1
ADC: Analog to digital converter
INA: Instrument Amplifier
OPA: Operational Amplifier
Base line voltage $V_{BL}$: the DC part or close to the DC part of a signal, which is composed of both DC and AC signal. It is close to the Average of the signal. The setting of Vref is very close to this base line voltage.
FSR: Full Scale Range Methods and equipment are disclosed herein that use a principle of "difference measurement and cancelation of base line" to provide a highly accurate measurement of DC voltage in comparison applications. Equipment is disclosed that provides a highly accurate measurement and comparison of OCV and DCIR during battery formation, testing and grading, especially for a battery manufacturing line. The methods and equipment are referred to as a Difference Voltage Measurement for Comparison (ΔVMFC) or ΔVMFC technology and equipment.

Figure 1:
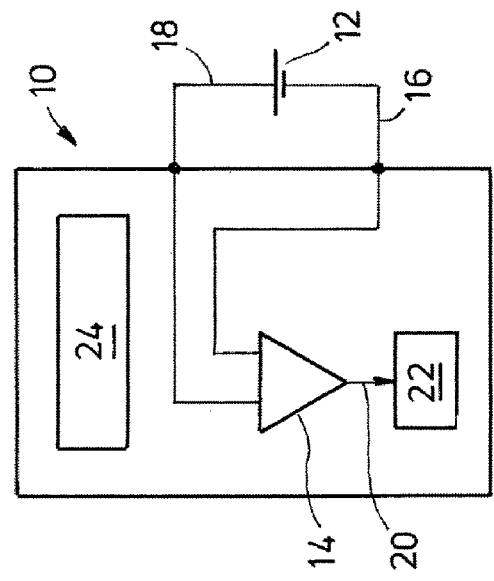
FIG. 1 is a schematic diagram of a prior art digital voltmeter.

The self-discharge rate (SDR) and the internal resistance (IR) of a battery are important parameters for indicating the quality of a battery, especially for grading and sorting cells and for making a battery pack. Currently direct measurement of open-circuit voltage (OCV) is widely used for SDR measurement. The OCV of a battery cell is measured directly with a volt meter or a multimeter, which preferably measures with high accuracy. FIG. 1 is a schematic diagram of a digital voltmeter 10 for measuring the OCV of a battery cell 12, which can be referred to as an OCV meter. An instrument amplifier 14 in voltmeter 10 has a first lead 16 connected to one terminal of the battery cell 12 and a second lead 18 connected to another terminal of cell 12. The instrument amplifier 14 has a lead 20 connected to an analog-to-digital converter 22 for providing a value of the OCV of battery cell 12 to a digital display 24. SDR is determined using a difference in voltage of a battery cell (Vcell) over a period of time. A battery cell should rest or age for some time up to days or weeks to get a measurable difference in OCV. Consequently, direct OCV measurement takes a long aging time, and the battery manufacturing industry needs to reduce the aging time to increase battery production, reduce production cost and space, preferably while getting more accurate measurements. ACR measurement is widely used for ohmic IR, or Ro, measurement. AC current is passed through a battery cell to determine ACR measurement. For example, ACR may use a 1 kHz AC signal for measurement. Direct Vcell measurement in DCIR measurement is widely used for measurement of IR including electrochemical polarization or Ro+Rp. The industry needs to have a better method and better equipment, which can offer lower space, lower cost, higher current and higher accuracy to replace traditional OCV/ACR/DCIR equipment.

The internal resistance (IR) of a battery is related to the charge/discharge current applicable to the battery. A battery with a high internal resistance will generate a higher voltage drop and will heat up more than a battery with a low IR. The ACR is used to evaluate the conductive resistance of a battery. A standard way for determining IR using a DCIR evaluation uses a step loading current test to calculate the DCIR value via the voltage difference caused by current change.

The self-discharge rate (SDR) of a battery is calculated as SDR=SD/Δt, where SD=ΔOCV(2−1)=OCV2−OCV1. The accuracy of the SDR measurement depends on the accuracy of the SD measurement and the Δt value. The accuracy of SDR can be expressed as (accuracy of SDR)=(daily accuracy of SDR)/Δt, which may be equivalently expressed as (daily accuracy of SDR)=(accuracy of SDR)*Δt=(accuracy of SD)/SD*Δt.

The prior art for measurement of SD is by directly measuring OCV of a cell over a time period Δt (aging time) and calculating SD=ΔOCV(2-1)=OCV2-OCV1. The accuracy of SD depends on the accuracy of the OCV measurement. For example, the OCV for a lithium ion battery is about 4V, and the measurement range of the voltmeter is typically about ±5V. For a multimeter with an accuracy of ±0.01% of its FSR in a ±5V range, the accuracy of SD is ±0.01%*10V=±0.001V or ±1 mV. Assuming a typical SD is 10 mV over a 10-day period, then the SDR=10 mV/10 days=1 mV/day, and the (daily accuracy of SDR)=(accuracy of SD)/SD*Δt=±1 mV/10 mV*10 day=±100%*day. The ±100%*day of "daily accuracy of SDR" means a battery cell needs to age 10 days to get accuracy of SDR to ±10% (=±100%*day/10 days). The value for ΔOCV(2-1) is relatively small compared to the value measured for OCV, which makes it difficult to determine the SDR accurately without aging a battery cell over a relatively long period of time, such as about 10 days or more.

The present invention provides a reference voltage (Vref) and employs difference measurements of ΔOCV2=OCV2-Vref and ΔOCV1=OCV1-Vref at a much smaller voltage range. The self discharge of a battery cell is then calculated as SD=ΔOCV(2-1)=OCV2-OCV1=ΔOCV2-ΔOCV1 at much higher accuracy. For a voltage measurement with an accuracy of ±0.01% FSR in ±50 mV range, the accuracy of SD is ±0.01%*100 mV=±0.01 mV. Also assuming the typical SD is 10 mV over a 10-day period, the daily accuracy of SDR=(accuracy of SD)/SD*Δt=±0.01 mV/10 mV*10 days=±1%*day. The 1%*day of the (daily accuracy of SDR) means only 1 day of aging is needed to get an accuracy of SDR of ±1% (=±1%*day/1 day). The direct measurement of OCV in the paragraph above, without a reference voltage, required 100 days of aging for this same accuracy, while the difference measurement using a reference voltage required only 1 day of aging for this same accuracy of measurement. This shows that a difference measurement of ΔOCV2 and ΔOCV1 is much more accurate than the prior art direct measurement of OCV2 and OCV1. This improved accuracy can allow a significant reduction in aging time and a reduction in space required for aging batteries, while achieving an SDR determination that is as reliable as obtained using the prior art method. Alternatively, a much more accurate determination of SDR can be achieved using the prior art aging time, which allows batteries to be sorted into groups having a more consistent value for SDR.

Figure 2B:
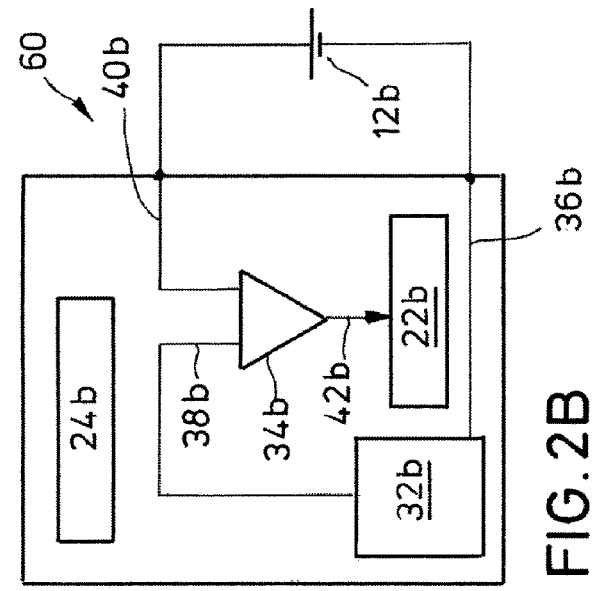
FIG. 2B is a schematic diagram of a difference voltmeter, according to the present invention.
Figure 2A:
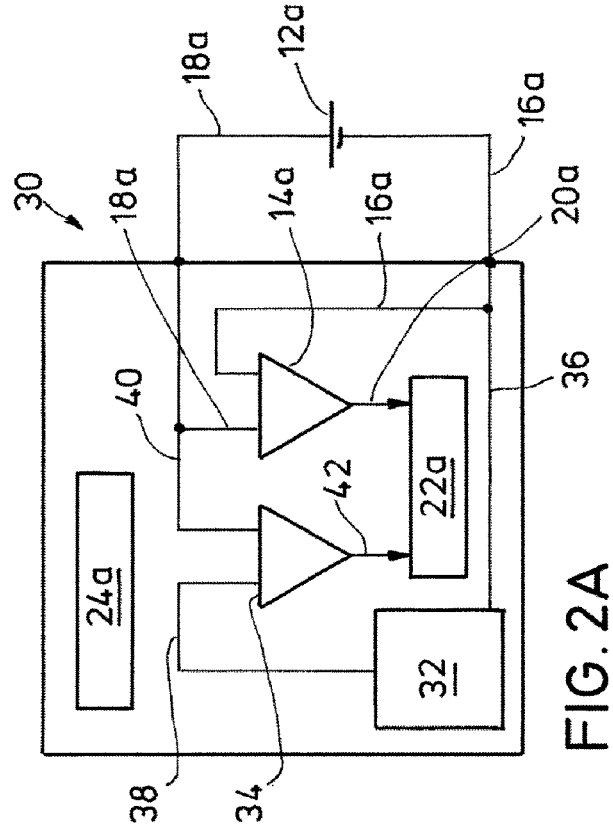
FIG. 2A is a schematic diagram of a difference voltmeter, according to the present invention.

FIG. 2A is a schematic diagram of a difference voltmeter 30 or a ΔOCV meter 30. Difference voltmeter (VM) 30 (ΔVM 30) includes the functionality of the VM 10 of FIG. 1. Difference VM 30 is also digital and measures the OCV of a battery cell 12a. A first instrument amplifier 14a in ΔVM 30 has a first lead 16a connected to one terminal of the battery cell 12a and a second lead 18a connected to another terminal of cell 12a. The first instrument amplifier 14a has a lead 20a connected to an analog-to-digital converter 22a for providing a value of the OCV of battery cell 12a to a digital display 24a. Difference VM 30 has a reference voltage generator 32 and a second instrument amplifier 34. Reference voltage generator 32 has a lead 36 connected to one terminal of battery cell 12a through the lead 16a and a lead 38 connected to the second instrument amplifier 34. The second instrument amplifier 34 thus has one input through lead 38 from the reference voltage generator 32 and another input from the other terminal of the battery cell 12a through a lead 40. The second instrument amplifier 34 provides an output through a lead 42 to the analog-to-digital converter 22a for providing a measurement of the difference between the voltage of the battery cell 12a and the reference voltage generated by the generator 32. The second instrument amplifier 34 thus provides a difference measurement between the voltage on the lead 40 connected to the battery cell 12a and the lead 38 connected to the reference voltage generator 32. The difference voltmeter 30 includes both output from the first instrument amplifier 14a, with measurement range of 5V and accuracy of 1 mV, and output from the second instrument amplifier 34, with measurement range of 50 mV and accuracy of 0.01 mV. and both outputs can be read on the digital display 24a. It can be understood that the output digital signal of the analog-to-digital converter 22a is not limited to being provided to the digital display 24a, and the output digital signal can also be provided to other processing units for corresponding processing.

Figure 3:
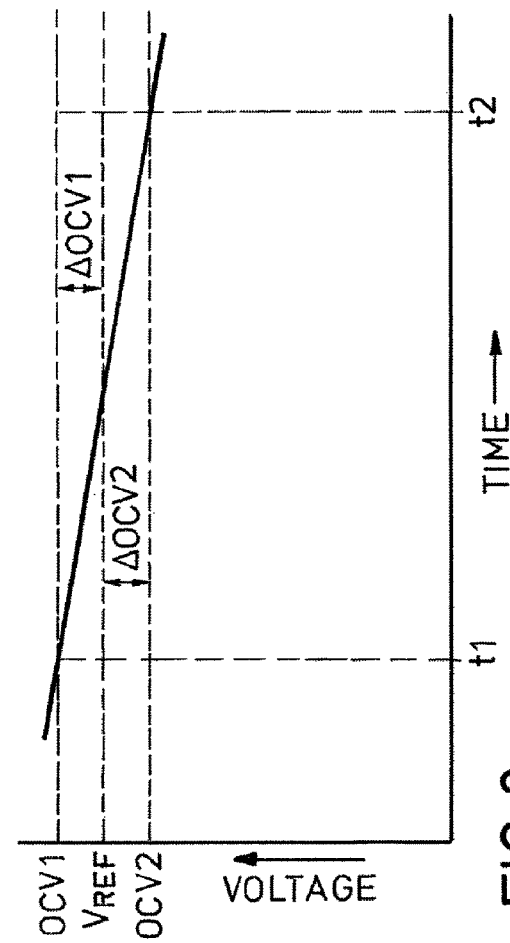
FIG. 3 shows the principle of SD and SDR determination using a reference voltage, according to the present invention.

It is appreciated that although the INAs 14a and 34 are employed to measure the voltage of the battery cell 12a and the difference voltage between the voltage of the battery cell 12a and the reference voltage generated by the generator 32 in the embodiment shown in FIG. 3, other types of operational amplifiers (OPA) can be employed in place of the INAs 14a and 34 for performing the similar functions. It is appreciated that the ΔVM 30 may include more or fewer components, for example, the display unit 24a may be not included in the AVM 30 in an embodiment.

FIG. 2B is a schematic diagram of a difference voltmeter 60 or a ΔOCV meter 60. Difference voltmeter (VM) 60 (ΔVM 60) does not includes the first instrument amplifier 14a of AVM 30 shown in FIG. 2A. Difference VM 60 has a reference voltage generator 32b and an instrument amplifier 34b. Reference voltage generator 32b has a lead 36b connected to a terminal of battery cell 12b and a lead 38b connected to the instrument amplifier 34b. The instrument amplifier 34b thus has one input through lead 38b from the reference voltage generator 32b and another input from the other terminal of the battery cell 12b through a lead 40b. The instrument amplifier 34b provides an output through a lead 42b to the analog-to-digital converter 22b for providing a measurement of the difference between the voltage of the battery cell 12b and the reference voltage generated by the generator 32b. The instrument amplifier 34b thus provides a difference measurement between the voltage on the lead 40b connected to the battery cell 12b and the lead 38b connected to the reference voltage generator 32b. The difference voltmeter 60 includes output from the instrument amplifier 34b, with measurement range of 50 mV and accuracy of 0.01 mV, and the outputs can be read on the digital display 24b. It can be understood that the output digital signal of the analog-to-digital converter 22b is not limited to being provided to the digital display 24b, and the output digital signal can also be provided to other processing units for corresponding processing.

FIG. 3 shows the principle of SD and SDR determination using a reference voltage according to the present invention. Battery cell 12a of FIG. 2A may generate a potential of 3.81225V at a time t1 shortly after formation, which is on leads 18a relative to ground. The output of instrument amplifier 14a on lead 20a will be read as OCV1=3.812 volts. If a reference voltage Vref is set at 3.80000 volts, then the voltage output value on lead 42 will be the difference between the battery voltage of 3.81225 volts and Vref of 3.80000 volts, which is 0.01225 volts and will be read as ΔOCV1=0.01225 volt. The difference voltmeter 30 will add the ΔOCV1=0.01225 volt on lead 42 to the Vref=3.80000 volts on lead 38 to yield a first measurement of open circuit voltage of the battery cell 12a at time t1 as OCV1Δ=ΔOCV1+Vref=0.01225+3.80000=3.81225 volts. After some period of time typically measured in minutes, hours or days, the difference voltmeter is used to measure voltage at time t2, and the voltage of the battery cell 12a will have dropped due to self discharge. Battery cell 12a may generate a potential of OCV2=3.79135 volts at time t2, which will be on leads 18a relative to a reference ground. The reference voltage Vref will still be at its set value of 3.80000 volts on lead 38. The output of instrument amplifier 14a on lead 20a will be read as OCV2=3.791 volts. The voltage output value on lead 42 ΔOCV2 will be the difference between 3.79135 volts on lead 40, which is the same value as for lead 18a, and Vref=3.80000 volts on lead 38. The ΔOCV2=3.79135−3.80000=−0.00865 volt. The difference voltmeter 30 will add the ΔOCV2=−0.00865 volts on lead 42 to the Vref=3.80000 volts on lead 38 to yield a second measurement of open circuit voltage of the battery cell 12a at time t2 as OCV2Δ=3.80000−0.00865 volts=3.79135V.

Assuming that t2−t1=200 hours, then the self discharge rate of the battery cell 12a can be calculated as SD/(t2−t1)=(OCV1−OCV2)/(t2−t1)=(3.812−3.791)/200=0.00011 V/hour, or as (OCV1Δ−OCV2 Δ)/(t2−t1)= ((ΔOCV1+Vref)−(ΔOCV2+Vref))/(t2−t1)=(ΔOCV1−ΔOCV2)/(t2−t1)=(0.01225+0.00865)/200=0.0001045 V/hour. In order to get an accurate enough reading of SD and SDR, the voltage drop between t2 and t1 needs to be about 10 times the accuracy of the voltage reading. This means this voltage drop needs to be greater than 10 mV if we read the OCV from lead 20a because the accuracy reading on 20a is 1 mV. This means that t2−t1 needs to be at least 10 mV/0.00011 V/hour=91 hours. If one reads the OCV Δ by reading ΔOCV on lead 42 with accuracy of 0.01 mV, the voltage drop needs only to be greater than or equal to 0.1 mV, and the value of t2−t1 needs only to be 0.1 mV/0.0001045 V/hour=0.96 hr. That is about one hour versus 91 hours. This means one can reduce the self-discharge time by about 100 times to get the same result in evaluating the self-discharge rate. Or, one can get a much more precise measurement of the self-discharge rate of each battery for better grading and sorting in a relatively short period of time. The present invention can be used to change the grading and sorting procedure for batteries, which can save or reduce storage time and storage space, while at the same time improving the quality of batteries and battery packs and while improving the battery manufacturing process.

The value for Vref for ΔOCV2 and ΔOCV1 should be the same value so that the value for Vref cancels out properly in the calculation for SD=ΔOCV(1−2)=OCV1−OCV2=ΔOCV1−ΔOCV2. For the same reason, the fluctuation/noise of Vref during measurement should be smaller than the error level of ΔOCV measurement (+0.01 mV).

In one embodiment, a rough range of the OCV of the battery cell 12a is known in a specific implementation, therefore the reference voltage Vref to be generated by the reference voltage generator 32 may be predefined, for example, the reference voltage Vref may be preconfigured as 3.80000 volt in the above example. In another embodiment, the reference voltage Vref is set based on a measured value of the voltage of the battery cell 12a. In the voltmeter 30 of FIG. 2A, the INA 14a may measure the voltage of the cell 12a such as the OCV of the battery cell 12a, and the reference voltage Vref may be set as a preconfigured value based on the measured voltage of the cell 12a, for example, the reference voltage Vref may be set as one of multiple preconfigured values that is closest to the measured voltage of the cell 12a. In the voltmeter 60 of FIG. 2B, the INA 34b may measure the voltage of the cell 12b such as the OCV of the battery cell 12b, and the reference voltage Vref may be set as a preconfigured value based on the measured voltage of the cell 12b. For example, the reference voltage Vref may be initially set as a relative small value and the INA 34b may measure the difference voltage between the voltage of the cell 12b and the Vref and obtain the voltage of the cell 12b by adding difference voltage and the Vref. Then the reference voltage Vref can be set as one of multiple preconfigured values that is closest to the measured voltage of the cell 12b.

It is appreciated that the function of reference voltage generator 32 and INA 34 in FIG. 2A and the function of reference voltage generator 32b and INA 34b in FIG. 2B are similar; therefore, the functions are described with reference to FIG. 2A herein.

Figure 4:
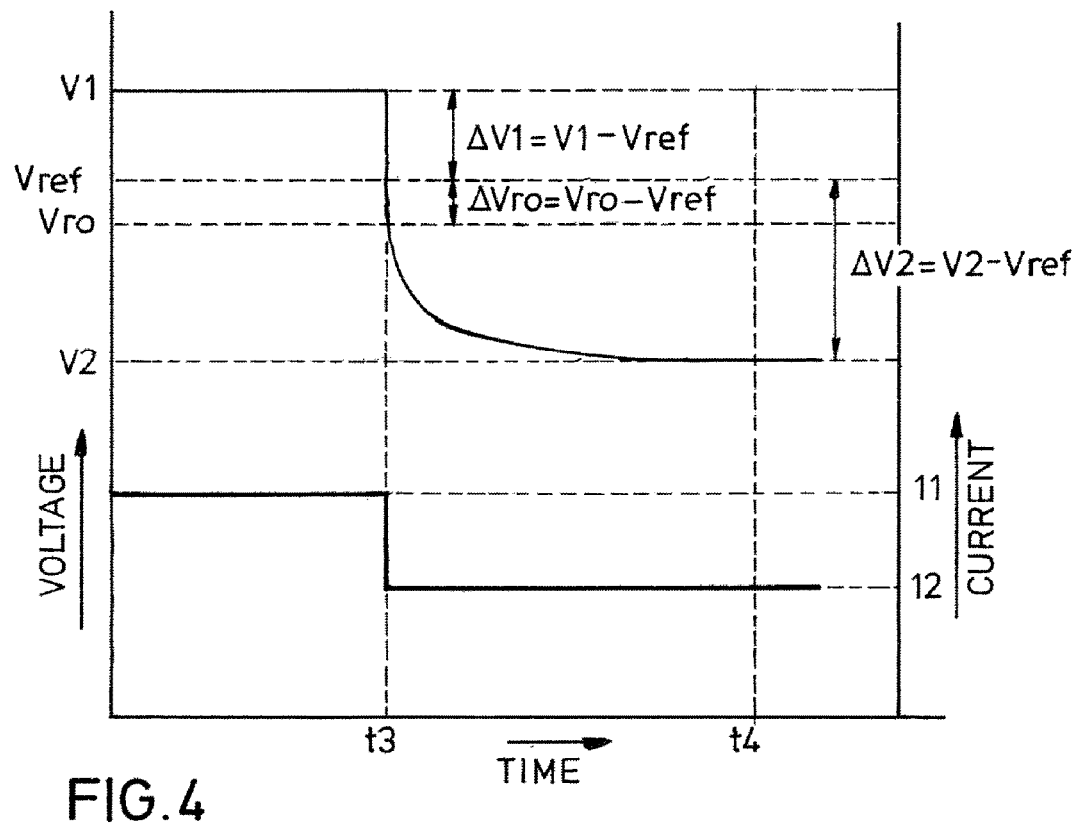
FIG. 4 illustrates a determination of IR using a DCIR evaluation with a step loading current test to calculate the DCIR value using a voltage difference caused by a current change.
Figure 5:
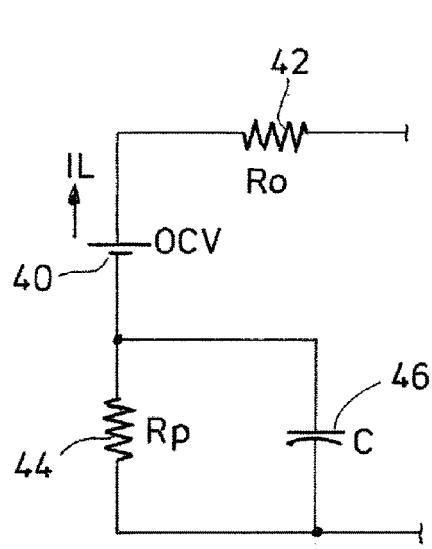
FIG. 5 is a simplified equivalent circuit of a battery.

FIG. 4 illustrates a determination of IR using a DCIR evaluation with a step loading current test to calculate the DCIR value via the voltage difference caused by current change. FIG. 5 is a simplified equivalent circuit of the battery, where:

IL: current going through the cell or current output to the load, where IL=Ip+Ic;
Ip: current flowing through polarization resistance Rp;
Ic: current flowing through polarization capacitance C;
Ro: ohmic resistance of the cell, which for example includes electrolyte resistance, diaphragm resistance, and contact resistance of various parts;
Voltage drop on the Ro equals to Vro−V1 or ΔVro−ΔV1;

$Ro = \text{abs}((Vro-V1)/(I2-I1)) = \text{abs}((\Delta Vro - \Delta V1)/(I2-I1));$ Voltage drop on Rp equals to V2−Vro or ΔV2−ΔVro;
Rp: polarization resistance of the cell;
C: polarization capacitance of the cell;

$Rp = \text{abs}((V2-Vro)/(I2-I1)) = \text{abs}((\Delta V2 - \Delta Vro)/(I2-I1));$ $IR = Ro+Rp = \text{abs}((V2-V1)/(I2-I1)) = \text{abs}((\Delta V2 - \Delta V1)/(I2-I1));$ and ACIR≈Ro.

With reference to FIGS. 2A, 4, 5 and 6, a current I1, which could be no current, is passed through battery cell 12a until at a time t3, the current is changed to I2 and held there until a time t4. The difference voltmeter 30 is used to measure the voltage across the battery cell 12a as the currents I1 and I2 are passed through the battery cell 12a. There is an instantaneous drop in voltage from V1 to Vro at the time that the current is changed from I1 to I2, the voltage drop is caused by the ohmic resistance of battery cell 12a and thus may be used to measure the ohmic resistance of battery cell 12a. During the elapsed time between t3 and t4, there is an additional and gradual voltage drop from Vro to V2. FIG. 5 is a simplified equivalent circuit of a battery. A current IL is going through a battery cell 40 or is a current output to a load. A resistor 42 represents the ohmic resistance of the battery cell 40. A resistor 44 represents the polarization resistance Rp of the battery cell 40. However, the polarization resistance Rp of the battery cell 40 is not simply represented by a resistor because the current IL is also moderated by a polarization capacitance 46 in parallel to the polarization resistance 44.

An IR value can be measured by a DCIR method, where IR=ΔV/ΔI=(V2−V1)/(I2−I1). The accuracy depends on the accuracy of ΔV and the value of ΔI. The prior art DCIR method is by directly measuring Vcell of the cell over the current change as $\Delta V/\Delta I=(V2-V1)/(I2-I1)$.

The principle of a $\Delta$DCIR method according to the present invention is to employ a reference voltage Vref and a difference measurement, which measures the difference of (Vcell−Vref) instead of Vcell so that IR=$\Delta V/\Delta I$=((V2−Vref)−(V1−Vref))/(I2−I1)=($\Delta V2-\Delta V1$)/(I2−I1). The accuracy improvement is proportional to the ratio of the voltage measurement range of full Vcell over the voltage measurement range for Vcell−Vref. Vcell−Vref can be much smaller than Vcell, and the voltage range to measure $\Delta$Vcell=Vcell−Vref can be much smaller than the voltage range of Vcell. Consequently, one can determine the value for $\Delta$DCIR much more accurately (up to 100 times higher when the ratio of the voltage measurement range of full Vcell over the voltage measurement range for Vcell−Vref is 100) with the option of using a much smaller current step (I2−I1) than used in the DCIR method, which can be as low as 1% to get the same accuracy.

The value for Vref for $\Delta V2$ and $\Delta V1$ should be the same so that the value cancels out properly, and IR=$\Delta V/\Delta I$=((V2−Vref)−(V1−Vref))/(I2−I1)=($\Delta V2-\Delta V1$)/(I2−I1) is determined properly. The fluctuation/noise level of Vref should be smaller than the error level of $\Delta$DCIR measurement. As mentioned above, the reference voltage Vref to be generated by the reference voltage generator 32 may be predefined or may be set based on a measured value of the voltage of the battery cell 12a or 12b.

The principles of the $\Delta$VM and $\Delta$DCIR methods include the following:

Abs($V$−Vref)<<$V$

The fluctuation/noise level of Vref during measurement should be smaller than the error level in the $\Delta$VM or $\Delta$DCIR measurement. Vref should be set and fixed for a test for comparison. The Vref should not change randomly and should not follow or change with V.

$\Delta$VM and $\Delta$DCIR are not directly used for a single point value/status measurement. $\Delta$VM and $\Delta$DCIR are used for comparison purposes.

ACR is generally preferred for determining Ro than traditional DCIR, where the traditional DCIR directly measures V1 and Vro and determines Ro as abs((V1−Vro)/(I2−I1)). The accuracy of the value of $\Delta V$=V1−Vro in directly measuring V1 and Vro is same as accuracy of V1 and Vro. Because the value of $\Delta V$=V1−Vro is usually very small in comparison to the value of V1, the accuracy for determining V1−Vro is fairly poor. For example, if the accuracy for determining a value for V1 is ±0.02% FSR or ±2 mV when FSR=10V and V1−mVro is ~10 mV, the accuracy for determining a value for V1−Vro is about ±2 mV/10 mV=±20%.

It is preferred to use a current as small as possible in IR measurement to avoid disrupting the electrochemical system of a battery. A small change in current flow results in a small change in voltage. For a small current change of I2−I1, the voltage change of V1−Vro will also be small, and the accuracy of the measurements will be poor.

ACR can usually get to ±0.5~1% or better with relatively small current because it measures directly the voltage fluctuation of V1 instead of V1 itself. ACR uses a difference mechanism for voltage measurement through the isolation of a very small AC signal from a large DC voltage baseline, which is approximately the cell voltage without an AC current passing through the cell. The ACR technology has relatively low accuracy (such as ±0.5% FSR) and low current capability due to a complicated procedure that includes isolation, chopping, rectifying, amplification and filtration to determine the AC signal. ACIR technology has an advantage over direct DCIR because it applies a much lower current.

$\Delta$DCIR should have an advantage over ACIR, because it requires similar low current level but has much higher accuracy such as ±0.02% FSR. The $\Delta$DCIR method may provide the same or a better accuracy level as ACR for ohmic resistance measurement. The $\Delta$DCIR method is simpler, cheaper, has a higher current capability and much better accuracy than the ACIR method.

As an example, the following table compares the precision of Ro and Rp with different technologies, ACR, DCIR and $\Delta$DCIR. From this example, one can see that DCIR technology may get comparable precision (0.1 m$\Omega$) to ACR technology only at a fairly large DC current (±5 A), when ACR's AC current is within 1 A or less. But $\Delta$DCIR technology may get 10 times better precision (0.01 m$\Omega$) to ACR at a comparable DC current (±0.5 A).

| Item | $\Delta$DCIR | DCIR | DCIR | ACR Note |
|---|---|---|---|---|
| V1(V) | 4.00200 | 4.00200 | 4.02000 | actual value |
| V1 reading(V) | 4.002 | 4.002 | 4.020 | reading at 20a, output of INA 14a, precision ±0.001 V at FSR of ±5 V |
| Vro(V) | 4.00100 | 4.00100 | 4.01000 | actual value |
| Vro reading(V) | 4.001 | 4.001 | 4.010 | reading at 20a, output of INA 14a, precision ±0.001 V at FSR of ±5 V |
| V2(V) | 3.99900 | 3.99900 | 3.99000 | actual value |
| V2 reading(V) | 3.999 | 3.999 | 3.990 | reading at 20a, output of INA 14a, precision ±0.001 V at FSR of ±5 V |
| I1(A) | 0.50000 | 0.50000 | 5.00000 | DC current precision: ±0.02% FSR, stability: 0.00001 A |
| I2(A) | −0.50000 | −0.50000 | −5.00000 | DC current precision: ±0.02% FSR, stability: 0.00001 A |
| Vro(reading) − V1(reading)(V) | −0.001 | −0.001 | −0.010 | calculated value from reading |
| V2(reading) − Vro(reading)(V) | −0.002 | −0.002 | −0.020 | calculated value from reading |

-continued

| Item | ΔDCIR | DCIR | DCIR | ACR | Note |
|---|---|---|---|---|---|
| Vref(V) | 4.00000 | 4.00000 | 4.00000 | | actual value |
| ΔVro(reading) (V) | 0.00100 | | | | Δ(Vro − Vref) reading at 42, output of INA 34, precision ±0.00001 V at FSR of ±0.05 V |
| ΔV1(reading)(V) | 0.00200 | | | | Δ(V1 − Vref) reading at 42, output of INA 34, precision ±0.00001 V at FSR of ±0.05 V |
| ΔV2(reading)(V) | −0.00100 | | | | Δ(V2 − Vref) reading at 42, output of INA 34, precision ±0.00001 V at FSR of ±0.05 V |
| Ro(Ω) | | 0.001 | 0.0010 | 0.001 | from VM measurement, =(Vro(reading) − V1(reading))/(I2 − I1) |
| Rp(Ω) | | 0.002 | 0.0020 | n/a | from VM measurement, =(V2(reading) − Vro(reading))/(I2-I1) |
| Ro(Ω) | 0.00100 | | | n/a | from ΔVM measurement, =(ΔVro(reading) − ΔV1(reading))/(I2 − I1) |
| Rp(Ω) | 0.00200 | | | n/a | from ΔVM measurement, =(ΔV2(reading) − ΔVro(reading))/(I2 − I1) ACR precision: ±0.5% FSR ACR FSR: 20 mΩ ACR precision: ±0.1 mΩ |

Difference measurement of open circuit voltage and of internal resistance of a battery cell based on a reference voltage can provide much more accurate determinations for ΔOCV and ΔDCIR. A difference voltmeter ΔOCV/ΔDCIR and equipment to implement it can have 10~100 times better accuracy compared to a voltmeter OCV/DCIR. The difference voltmeter is based on using the same Vref for a set of related voltage measurements for comparison purposes. The Vref values, as well as the error of Vref, are canceled in the comparison, and hence, even a relatively low accuracy of Vref does not affect the accuracy of the measurement for ΔV, ΔOCV and ΔDCIR. Although the accuracy of Vref is not substantially important, the stability and constancy of Vref are important. The Vref should have very low ripple and/or noise and should be fixed for a test.

For example, the SD and SDR measurements are for comparing the OCV at different points in time for grading and sorting battery cells. The Vref values are canceled in ΔOCV measurement for the SD and SDR, where SD=ΔOCV=OCV2−OCV1=ΔOCV2−ΔOCV1. The Vref values are also canceled when comparing SD and SDR of a group of cells. As another example, DCIR measurement is to compare the Vcell at different current and the Vref are canceled when employing the ΔDCIR technology disclosed herein, where ΔV/ΔI=((V2−Vref)−(V1−Vref))/(I2−I1)= (ΔV2−ΔV1)/(I2−I1).

Figure 6:
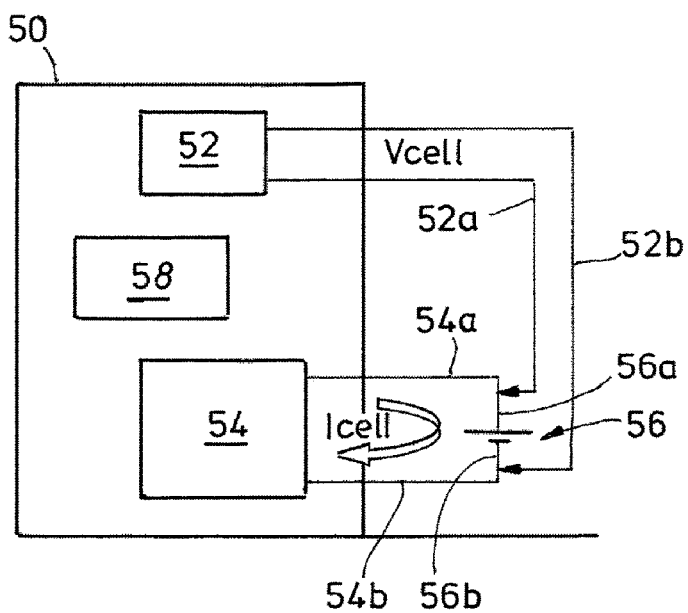
FIG. 6 is a schematic diagram of ΔOCV and ΔDCIR equipment for grading and sorting batteries.

FIG. 6 is a schematic diagram of ΔOCV and ΔDCIR equipment for grading and sorting new or used batteries, such as for quality control and for sorting batteries into groups for making battery packs. A measurement module 50 includes a difference voltmeter (VM) 52, such as the difference VM 30 or 60 described with reference to FIG. 2A or 2B. Measurement module 50 includes a charging and discharging module 54 designed and configured to provide a charging or discharging current for a battery cell 56. Particularly, the charging and discharging module 54 is configured to pass different currents through the battery cell 56, which has a first terminal 56a and a second terminal 56b. A lead 52a connects the difference VM 52 to battery terminal 56a, and a lead 52b connects the difference VM 52 to battery terminal 56b. A lead 54a connects the charging and discharging module 54 to battery terminal 56a, and a lead 54b connects the charging and discharging module 54 to battery terminal 56b. A microcontroller 58 is integrated with the difference VM 52 and the charging and discharging module 54, typically with each of these components mounted on a printed circuit board and connected by traces, thereby comprising the measurement module 50. Measurement module 50 can be used to conduct the tests on battery cell 56 that were described with reference to FIGS. 2-4.

FIG. 6 is simplified to show how tests can be conducted on a single battery cell 56. There are many, many batteries to test in a commercial application. Battery cell 56 is representative of a battery tray that may hold from 1 to a few hundred batteries. For example, a battery tray comprises a printed circuit board (PCB) that has a plurality of battery holders, where each battery holder has a positive terminal in the center of a magnetic ring and a pair of spring fingers outside of the magnetic ring for holding a cylindrical battery in an upright position. A battery is received in each of the battery holders, which connect positive and negative terminals of the batteries to traces on the PCB. The PCB is preferably a multi-layer circuit board with traces and components.

In one embodiment, the present invention includes a battery testing module that comprises a cabinet having front, back, left and right sides and at least one pair of guide rails, wherein one of the pair of guide rails is received in the cabinet on the left side and the other is received in the cabinet on the right side, and wherein the pair of guide rails is configured to receive a battery tray that holds a plurality of batteries. The battery tray can be a same battery tray used during formation and testing of the batteries. The battery tray comprises: a printed circuit board (PCB) having opposing upper and lower sides and an edge; a plurality of battery holders on the upper side of the PCB; electronic devices or components operatively engaged with the plurality of battery holders through traces on or in the PCB for measuring parameters of the batteries during formation and testing; and an edge connector on the edge of the PCB, where the edge connector is operatively engaged with the plurality of battery holders and with the electronic devices or components through traces on or in the PCB. Each battery holder preferably has two or more upright spring fingers for holding and engaging a battery, which also function as a negative terminal, and a positive terminal for contact with one end of a battery. The edge connector preferably has first and second opposing sides, with each positive terminal connected to the first side, and each negative terminal is connected to the second side. Batteries are preferably received in the battery holders in an upright position with the lower end of the battery touching the positive terminal and with the spring fingers touching the cylindrical case of the battery, which is the negative terminal.

The battery testing module can be incorporated in a battery formation rack or in a battery aging rack or can be a standalone cabinet. The battery testing module includes a measurement module located in the cabinet near the back and adjacent to the pair of guide rails for receiving and connecting to the battery tray. The measurement module is designed and configured to include the reference voltage, the difference voltmeter and the difference DCIR described herein. The measurement module is designed and configured to determine the OCV, the IR and the SDR of each battery in the battery tray(s) using the difference measurement principles described herein. Each battery is preferably uniquely identified, such as by affixing a bar code to each battery. The measurement module is preferably designed and configured to identify groups of batteries having the same or very similar values for OCV, IR and SDR, as determined using the difference measurement principles described herein.

The present invention can be employed in and includes a battery sorting module, which may be a standalone module or which may be incorporated with the battery testing module. The battery testing module preferably includes automation such as a robotic arm. The battery sorting module uses the information determined by the battery testing module and physically removes each battery from the battery tray and places each of the batteries into bins, where one bin is designated for one group of batteries. Some batteries may be considered unfit for use and are sorted into a bin for batteries to be reworked, recycled or discarded. Other bins will receive batteries having reasonably consistent values for OCV, IR and SDR. A battery pack can be made from the batteries in one of these bins so that all of the batteries in the battery pack have reasonably consistent values for OCV, IR and SDR.

In another embodiment, the present invention provides a battery grading and sorting machine that includes the following components: a battery tray for receiving and holding a plurality of batteries, preferably a double-sided, smart battery tray such as described in International Patent Application No. PCT/US2020/062548, Publication No. WO 2021/113161 A2; a battery testing cabinet; one or more measurement modules, such as described with reference to FIGS. 2A-6, received in the battery testing cabinet, wherein the measurement modules are configured to employ a difference voltmeter as described with reference to FIG. 2A or 2B and to determine an open circuit voltage of each battery cell using a reference voltage at two different times and to calculate a self-discharge rate for each battery cell, and wherein the measurement modules are configured to determine the internal resistance of each battery cell using a reference voltage and the difference DCIR method described with reference to FIG. 4; a charging and discharging test module received in the battery testing cabinet, preferably one for each of the measurement modules; hardware and software for grading, labeling and grouping batteries into battery groups having similar values for parameters such as open circuit voltage, self-discharge rate and internal resistance; and a battery sorting unit for plucking batteries out of the battery trays and placing the batteries into bins according to the battery groups. The present invention also includes method steps associated with and for operating the equipment and modules described in these embodiments.

Embodiments of the present invention include the following.

1. A method that:
    sets and fixes a reference voltage, Vref, that is close to a DC voltage base line; and
    measures a voltage difference $\Delta V$ (v-vref) of a subject voltage V to Vref for
        an object, such as a battery cell, at different time to compare and calculate a change in the value,
        a group of objects to compare a difference in a value for the objects, and
        a group of objects at different times to compare/calculate a difference or change in a value for the objects.
2. Equipment ($\Delta$VMFC) that uses the principles of difference measurements for setting/measuring/calculation/displaying the following at much high accuracy than traditional direct measurement of DCV:
    voltage of an object;
    change rate of an object;
    status difference of a group of objects; and
    changing rate and/or changing rate difference of a group of objects, where a typical object is a battery cell.
3. Equipment that can set a reference voltage Vref and measure/calculate and output/display the following:
    voltage of an object, and
    a difference voltage, ($\Delta$VMFC), voltage change rate, comparison of voltage difference and voltage difference change rate.
4. Equipment using the principles of $\Delta$OCV/$\Delta$DCIR for setting/measuring/calculation/displaying the following at much high accuracy than traditional direct measurement of Vcell:
    set and fix reference voltage Vref;
    OCV, Vcell;
    SD and SDR of cells; and
    Ro, Rp and Ro+Rp of cells.
5. Using $\Delta$VMFC or $\Delta$OCV/$\Delta$DCIR for OCV/DCIR measurement and comparison in battery formation and testing.
6. Using the $\Delta$DCIR method and equipment to replace ACR in battery IR measurement.

An embodiment 1 of the present invention is a method for forming and testing a plurality of batteries. The method comprises the steps of:
    forming raw batteries; and
    testing the raw batteries by
        setting a reference voltage Vref;
        measuring a $\Delta$OCV1 at a first time T1 and then a $\Delta$OCV2 at a second time T2,
        calculating a self discharge (SD) for each battery as the difference between $\Delta$OCV1 and $\Delta$OCV2; and calculating a self discharge rate (SDR) for each battery as SD divided by the difference between T2 and T1.

An embodiment 2 of the present invention is the embodiment 1, further comprising determining the internal resistance (IR) of each battery in the set of raw batteries by:
 passing a first current I1 and a second current I2 through each battery, where I2 is not equal to I1,
 measuring a first ΔV1=(V1−Vref) for each cell while passing the current I1 through the cell,
 measuring a second ΔV2=(V2−Vref) for each cell while passing the current I2 through the cell,
 calculating a ΔV as equal to (ΔV2−ΔV1);
 calculating a ΔI as I2−I1; and
 calculating IR as equal to ΔV/ΔI.

The embodiments described herein are merely examples for the sake of clarity and are not intended to limit the scope of the present invention. Other variations or modifications may be made by those skilled in the field of the above-described technology. There is no need and no way to describe all possible implementations of the principles of the difference measurement technology described herein. Obvious changes or variations resulting therefrom are still within the scope of the invention.

What is claimed is:

1. A difference voltmeter, comprising:
 a reference voltage generator (RVG) configured to generate a reference voltage Vref and to output the reference voltage via a first lead;
 a first operational amplifier (OPA), wherein the first OPA has a first input lead for connection to a first terminal of an object to be measured and a second input lead for connection to the first lead of the RVG, and wherein the first OPA is configured to output via an output lead a difference voltage representing a difference between a voltage of the object and the reference voltage;
 a second OPA, wherein the second OPA has a first input lead for connection to the first terminal of the object and a second input lead for connection to a second terminal of the object, and wherein the second OPA is configured to output via an output lead a voltage representing the voltage of the object, and
 an analog-to-digital converter (ADC) configured to receive the difference voltage from the output lead of the first OPA and to convert the difference voltage from an analog signal to a digital signal, wherein the ADC is configured to receive the voltage from the output lead of the second OPA and to convert the voltage from an analog signal to a digital signal,
 wherein an amplification rate of the first OPA is at least ten times greater than an amplification rate of the second OPA, or wherein the amplification rate of the first OPA is at least a hundred times greater than the amplification rate of the second OPA, or wherein a full scale range (FSR) of the second OPA is at least ten times greater than a FRS of the first OPA, or wherein the FSR of the second OPA is at least a hundred times greater than the FRS of the first OPA, or wherein the voltage of the object is at least ten times greater than the difference between the voltage of the object and the reference voltage, or wherein the voltage of the object is at least a hundred times greater than the difference between the voltage of the object and the reference voltage.

2. The difference voltmeter of claim 1, wherein the first OPA is an instrumentation amplifier (INA) and the second OPA is an INA, or wherein the reference voltage is set to be a preconfigured value based on a measured value of the voltage of the object by the first OPA, or the reference voltage is set to be a preconfigured value based on a measured value of the voltage of the object by the second OPA.

3. A battery testing apparatus comprising:
 a difference voltmeter according to claim 1;
 a charging and discharging module for providing a charging or discharging current to one or more batteries; and
 a control unit configured to provide outputs indicating values of parameters for the one or more batteries, wherein at least one of the parameters is an open-circuit voltage (OCV), a self-discharge (SD), a self-discharge rate (SDR) or an internal resistance (IR) of the one or more batteries.

4. The battery testing apparatus of claim 3, wherein the reference voltage generator (RVG) is configured to generate a reference voltage Vref, wherein the first operational amplifier (OPA) is configured to output a first difference open circuit voltage ΔOCV1 of a battery at a time t1 and a second difference open circuit voltage ΔOCV2 of the battery at a later time t2, wherein the difference open circuit voltage of a battery is the open circuit voltage of the battery minus the reference voltage Vref, and wherein the control unit is configured to determine the SD for the battery as ΔOCV2−ΔOCV1 and to determine the SDR for the battery as (ΔOCV2−ΔOCV1)/(t2−t1).

5. The battery testing apparatus of claim 3, wherein the RVG is configured to generate a reference voltage Vref, wherein the control unit is configured to cause the charging and discharging module to deliver a current I1 and a different current I2 one by one passing through a battery, wherein the first OPA is configured to output a first difference voltage ΔV1 of the battery while the current I1 is passing through the battery and a second difference voltage ΔV2 of the battery while the current I2 is passing through the battery, wherein the difference voltage ΔV1 or ΔV2 of the battery is the voltage V1 or V2 of the battery minus the reference voltage Vref, and wherein the control unit is configured to determine the IR of each battery as equal to (ΔV2−ΔV1)/(I2−I1).

6. The battery testing apparatus of claim 3, further comprising a battery labeling module for providing a unique identifier for each battery, wherein the control unit is configured to associate values of one or more of OCV, SD, SDR and IR for each battery to the identifier of the battery, and wherein the control unit is a microcontroller or a computing device or a computer or a personal computer.

7. A battery sorting apparatus comprising:
 a battery testing apparatus according to claim 3, wherein the control unit is configured to group batteries according to their values of OCV, SD, SDR or IR into two or more groups; and
 a battery sorting module for physically placing each battery in a bin associated with each group.

8. An apparatus for making a battery pack comprising:
 a battery sorting apparatus according to claim 7; and
 a device for physically plucking a battery from a bin and placing the battery in a battery-pack holder.

9. A battery testing machine comprising a battery testing apparatus according to claim 3, wherein the battery testing apparatus is configured to:
 connect electrically to a battery cell;
 provide the reference voltage Vref;
 measure a first difference open circuit voltage ΔOCV1 at a first time t1, wherein ΔOCV1=OCV1−Vref, wherein OCV1 is a first open-circuit voltage of the battery cell at the first time t1;

measure a second difference open circuit voltage ΔOCV2 at a second time t2, wherein ΔOCV2=OCV2−Vref, wherein OCV2 is a second open-circuit voltage of the battery cell at the second time t2;
calculate the SD for the battery cell as the difference between ΔOCV1 and ΔOCV2; and
calculate the SDR for the battery cell as SD divided by the difference between t2 and t1.

10. The battery testing machine of claim 9, wherein the battery testing apparatus is configured to:
pass a first current I1 and a second current I2 through the battery cell, where I2 is not equal to I1;
measure a first difference voltage ΔV1=(V1−Vref) of the cell while passing the current I1 through the cell, wherein V1 is a voltage of the battery cell while passing the current I1 through the cell;
measure a second difference voltage ΔV2=(V2−Vref) of the cell while passing the current I2 through the cell, wherein V2 is a voltage of the battery cell while passing the current I2 through the cell;
calculate a ΔV=(ΔV2−ΔV1);
calculate a ΔI as I2−I1; and
calculate the IR of the battery cell as equal to ΔV/ΔI.

11. A machine for sorting batteries comprising an automated unit that physically separates batteries into groups based on values determined for OCV, SD, SDR or IR by the battery testing machine of claim 10.

12. A method for testing a battery cell using the battery testing apparatus of claim 3, comprising:
providing the reference voltage Vref;
measuring a first difference open circuit voltage ΔOCV1 at a first time t1, wherein ΔOCV1=OCV1−Vref, wherein OCV1 is a first open-circuit voltage of the battery cell at the first time t1;
measuring a second difference open circuit voltage ΔOCV2 at a second time t2, wherein ΔOCV2=OCV2−Vref, wherein OCV2 is a second open-circuit voltage of the battery cell at the second time t2;
calculating a self discharge (SD) for the battery cell as the difference between ΔOCV1 and ΔOCV2; and
calculating a self discharge rate (SDR) for the battery cell as SD divided by the difference between t2 and t1.

13. The method of claim 12, further comprising:
passing a first current I and a second current I2 through the battery cell, where I2 is not equal to I1;
measuring a first difference voltage ΔV1=(V1−Vref) of the battery cell while passing the first current I1 through the battery cell, wherein V1 is a voltage of the battery cell while passing the first current I1 through the cell,
measuring a second difference voltage ΔV2=(V2−Vref) of the battery cell while passing the second current I2 through the cell, wherein V2 is a voltage of the battery cell while passing the second current I2 through the cell,
calculating a ΔV=(ΔV2−ΔV1);
calculating a ΔI as I2−I1; and
calculating IR as equal to ΔV/ΔI.

14. A method for determining the self-discharge rate of a battery comprising the steps of:
using a difference voltmeter that comprises:
a reference voltage generator (RVG) configured to generate a reference voltage Vref and to output the reference voltage via a first lead;
a first operational amplifier (OPA), wherein the first OPA has a first input lead for connection to a first terminal of an object to be measured and a second input lead for connection to the first lead of the RVG, and wherein the first OPA is configured to output via an output lead a difference voltage representing a difference between a voltage of the object and the reference voltage;
a second OPA, wherein the second OPA has a first input lead for connection to the first terminal of the object and a second input lead for connection to a second terminal of the object, and wherein the second OPA is configured to output via an output lead a voltage representing the voltage of the object, and
an analog-to-digital converter (ADC) configured to receive the difference voltage from the output lead of the first OPA and to convert the difference voltage from an analog signal to a digital signal, wherein the ADC is configured to receive the voltage from the output lead of the second OPA and to convert the voltage from an analog signal to a digital signal,
measuring an open circuit voltage (OCV) of the battery at a time t1, thereby obtaining a value of OCV1 volts;
measuring the open circuit voltage of the battery at a later time t2, thereby obtaining a value of OCV2 volts, wherein OCV1 and OCV2 are determined using a voltmeter that has a full scale range (FSR);
measuring difference OCV values as ΔOCV1=OCV1−Vref at time t1 and ΔOCV2=OCV2−Vref at time t2, wherein ΔOCV1 and ΔOCV2 are determined using a difference voltmeter, and wherein the FSR of the difference voltmeter is less than the FSR of the voltmeter;
calculating a self-discharge (SD) of the battery as equal to (ΔOCV2−ΔOCV1); and
calculating the self-discharge rate of the battery as equal to SD/(t2−t1).

15. A method for determining the internal resistance (IR) of a battery using direct current (DCIR), comprising the steps of:
measuring a voltage V1 of a battery at a time t1 while passing a direct current I1 through the battery by using a first instrumentation amplifier (INA1) of a difference voltmeter (DVM);
changing the direct current passing through the battery to I2, wherein I2 is not equal to I1;
measuring a voltage V2 of the battery at a time t2 while passing the direct current I2 through the battery by using the INA1 of the DVM;
generating a voltage Vref by using a reference voltage generator of the DVM;
measuring a difference voltage ΔV1=(V1−Vref) at the time t1 while passing the direct current I1 through the battery by using a second instrumentation amplifier (INA2) of the DVM;
measuring a difference voltage ΔV2=(V2−Vref) at the time t2 while passing the direct current I2 through the battery by using the INA2 of the DVM, wherein each of INA1 and INA2 have a full scale range (FSR), and wherein the FSR of INA2 is less than the FSR of INA1; and
calculating the IR of the battery as equal to (ΔV2−ΔV1)/(I2−I1).

16. The method of claim 15, wherein abs (ΔV1)<=0.1*abs (V1), and wherein abs (ΔV2)<=0.1*abs (V2), or wherein the FSR of INA2 is less than 0.1*FSR of INA1.

* * * * *